United States Patent [19]

Burkhardt et al.

[11] Patent Number: 5,002,916
[45] Date of Patent: Mar. 26, 1991

[54] SILICA SUPPORTED VANADIUM CARBOXYLATE CATALYSTS

[75] Inventors: Terry J. Burkhardt, Humble; William B. Brandley, Deer Park, both of Tex.

[73] Assignee: Exxon Chemical Patents Inc., Linden, N.J.

[21] Appl. No.: 487,692

[22] Filed: Mar. 2, 1990

[51] Int. Cl.$^5$ ............................................. C08F 4/68
[52] U.S. Cl. ...................................... 502/120; 502/123; 502/125; 502/126; 502/127; 526/129
[58] Field of Search ............... 502/120, 123, 125, 126, 502/127

[56] References Cited

U.S. PATENT DOCUMENTS 4,508,842  4/1985  Beran et al. ........................ 502/112

OTHER PUBLICATIONS

Cotton et al., Inorg. Chem., 25, (1986), pp. 3505–3512.

Primary Examiner—Patrick P. Garvin
Assistant Examiner—Brent Peebles
Attorney, Agent, or Firm—M. B. Kurtzman

[57] ABSTRACT

Supported catalysts component for producing ethylene-propylene elastomers comprising a compound represented by the formula:

(1) $[V_3O(RCO_2)(ED)_3]_2 \cdot V_2O_2X_6$, or
(2) $V_3O(RCO_2)_6(ED)_3$ wherein R is alkyl, cycloalkyl, aryl and haloalkyl,
wherein R is alkyl, cycloalkyl, aryl and haloalkyl,
ED is an electron donor selected from alkyl esters of aliphatic and aromatic carboxylic acid, aliphatic ketones, aliphatic amines, aliphatic alcohols, alkyl and cycloalkyl ethers, and mixtures thereof; and
X is selected from Cl—, Br—, Fl— or $RCO_2^-$.

8 Claims, No Drawings

SILICA SUPPORTED VANADIUM CARBOXYLATE CATALYSTS

FIELD OF THE INVENTION

The invention relates to improved techniques for use in ethylene-propylene copolymerization, and more particularly, to vanadium carboxylate compositions supported on a solid carrier used in producing ethylene-propylene (EP) and propylene-diene terpolymer elastomers (EPDM), (EP and EPDM hereinafter referred to as EP elastomers). EP elastomers obtained using these improved catalysts are characterized by good particle morphology and the polymerization process is characterized by the substantial absence of undesirable sheeting or fouling of the reactor walls.

DESCRIPTION OF THE PRIOR ART

An early patent which discloses supported vanadium catalysts for the preparation of the ethylene-propylene elastomers is GB 1,309,303. The elastomeric copolymers are made in a liquid media consisting of one of the monomers of the reaction, and in the presence of a supported Ziegler-Natta type catalyst comprising a halide of a metal of Groups IVB, VB, VIB and an organo-metallic compound (66the Edition of Handbook of Chemistry and Physics, (RC Press 1985-1986, CAS version).

GB 2,105,355 discloses the use of supported vanadium catalysts in producing EPDM. The carrier is an inorganic oxide mixture of silica-alumina, magnesia, titania, Al silicate, and silica, with specific surface of 10-1000 square m/g, porosity 0.2-1 cc/g. and particle sizes of 0.2-300 (25-150). The molar ratio of catalyst components is 0.5-2. The carrier may be impregnated with liquid or gaseous (a) and (b); the (b) component being applied before the (a) component wherein:

(a) is $V(=O)Cl_x(OR)_{(3-x)}$, where $x=0-3$ and R is a hydrocarbon group (particularly, a 1-10 carbon aliphatic or aromatic hydrocarbon group); $VCl_y(OR)_{(4-y)}$ where $y=3-4$ $V(=O)_{(3-z)}(AcAc)_z$, where $z=2-3$ and (AcAc) is an acetylacetonate group,; $V(=O)Cl_2(AcAc)$ or $V(=O)Cl(AcAc)_2$ or $VCl_3.nB$, wherein $n=2-3$ and B is a Lewis base, e.g. tetrahydrofuran, which forms hydrocarbon-soluble complexes with $VCl_3$, $VOCl_3$, $VOCl_4$ and $V(AcAc)_3$. The concentration of V on the carrier is 0.01-0.5(0.02-0.3) mmols/g.

(b) is $AlCl_xR_{(3-x)}$ where $x=0-3$ and R is a hydrocarbon group.; $R_yAl(OR)_{(3-y)}$, where $y=1-2$; and $R_2AlH$, $Al(C_2H_5)_2Cl$, $Al(C_2H_5)_3$ and $Al(C_2H_5)Cl_2$, $Al(C_2H_5)Cl_2$ are claimed. The molar ratio of Al:V 10-200(15-100).

U.S. Pat. No. 4,508,842 describes a gas phase homo or copolymerization of ethylene using a supported catalyst made by treating $VC_{13}$ with a Lewis base, however, the Lewis bases employed in this patent are not chelating agents but rather monodentate ligands, and the products obtained are not normally ethylene-propylene elastomers, but high ethylene polymers having at least 70 mole percent ethylene.

U.S. Pat. No. 4,066,571 pertains to the use of polymerization catalysts made by treating transition metal salts with acetylating agents. In example 7 thereof, the salt acetylated is $VC_{13}$. Vanadium compounds are also used in Examples 15 and 33, however, the product is polyethylene rather than a copolymer elastomer.

Cotton et al in *Inorg. Chem.* 25, 3505-3512 (1986) discloses compounds containing oxo-centered trivanadium cores surrounded by six carboxylato groups represented by the generic formula $(V_3O(RCO_2)_6L_3]^+$; acetate is one of the carboxylato groups disclosed. No utility is taught for the resulting product as a catalyst and there is no suggestion that the product can be usefully employed as a supported catalyst.

In an article by Kreisel et al - Arylvanadium Compounds 12, Mesitylvanadium (III) acetylacetonates (Sept. Chem. Friedrich-Schiller-Univ. Jena, DDR-6900 Jena, Ger Dem. Rep). Z. Chem. 1966, 26(7), 280-1(Ger.), the complex $VCl(AcAc)_2$ is prepared, as well as related complexes which use tetrahydrofuran (THF) in the process of preparation. There is no disclosure that these products have utility as polymerization catalysts.

SUMMARY OF THE INVENTION

The present invention pertains to supported vanadium carboxylate catalysts compositions and processes of using the same for producing ethylene-propylene elastomers. Preferably, the polymerization process employed is a bulk polymerization process. Although the bulk process is preferred, the catalysts of this invention can be usefully employed for the production of ethylene-propylene elastomers in gas phase or solution polymerization processes. The bulk and gas phase processes eliminate both the solvent system and water quench needed for product recovery. By carrying out the polymerization in bulk liquid propylene, the product recovery is as simple as flashing the ethylene and propylene as gases and collecting the solid particle form of ethylene-propylene elastomers.

Depending on the nature of the carboxylate group employed in producing the catalyst of this invention, the vanadium carboxylates can be cationic or neutral.

The catalyst component comprises vanadium carboxylates, represented by the formulas:

(1) $[V_3O(RCO_2)_6(ED)_3]_2 \cdot V_2O_2X_6$, or (2) $V_3O(RCO_2)_6(ED)_3$ wherein R may be alkyl, cycloalkyl, aryl and haloalkyl.

Alkyl=$C_1$-$C_{14}$ or $C_{18}$ and aryl in $C_6$-$C_{10}$

Illustrative but not limiting examples of the carboxylate group are: acetate, propionante, 2-ethyl hexonate, hexanoate, benzoate, napthanoate, cyclohexanoate, fluorocetate and trichloroacetate.

X is selected from chlorine, bromine, flourine or $RCO_2^-$.

The electron donor (ED) is an organic Lewis base, and is selected from the group consisting of alkyl and aromatic carboxylic acids and their esters, aliphatic and aromatic ketones, aliphatic and aromatic amines, aliphatic and aromatic alcohols, alkyl, aromatic cycloalkyl ethers, and mixtures thereof.

Preferred electron donors are alkyl and cycloalkyl ethers, including particularly tetrahydrofuran.

Illustrative but non-limiting vanadium carboxylate catalyst components for the ionic compound (1) are: $[V_3O(CH_2CH_3CO_2)_6 (THF)^3]_2 \cdot V_2O_2Cl_6$, $[V_3O(CH_3CO_2)_6 (THF)_3]_2 \cdot V_2O_2Cl_6$, $[V_3O(C_4H_9(CH_2CH_3)CHCO_2)_6 (THF)_3]_2 \cdot V_2O_2Cl_6$, $[V_3O(C_6H_5CO_2)_6(THF)_3]_2 \cdot V_2O_2CL_6$, and $V_3O(CH_2CH_3CO_2)_6(C_5H_5N)_3$.

The R substituents and the electron donor (ED) in the neutral vanadium carboxylate catalyst compound (2) may be the same as those in the ionic compound of formula (1).

The cocatalyst which can be employed is represented by the formula: $AlR_nX_{3-n}$ wherein $n=2$ and 3, preferably 3 and R is a $C_1$ and $C_8$ alkyl group. Preferred cocatalysts include $C_2$ to $C_8$ trialkylaluminum compounds. A particularly preferred cocatalysts is triisobutyl aluminum TiBAL Optionally a promoter represented by the formula:

wherein R' is hydrogen or unsubstituted or halosubstituted lower alkyls containing up to about six carbon atoms.

X' is a halogen, and b is 1 or 2 can be employed with the catalyst system comprising the vanadium catalyst component and the cocatalyst.

Illustrative promoters will include fluoro, chloro or bromo substituted ethane or methane having least 2 halogens attached to a carbon atom. Preferred promoters include $CCL_4$, $CHCl_3$, $CH_2Cl_2$, $CFCL_3$ $CH_3CCl_3$ and $CF_2CL$ $CCL_3$. Particularly preferred promoters are $CHCl_3$, $CH_2Cl_2$ and $CH_3CCl_3$.

The new catalyst component of this invention desirably comprise vanadium carboxylates supported on a porous support material. The unsupported vanadium carboxylates have the same desirable catalyst performance characteristics in that they produce EP copolymers of desirable composition. The supported catalyst, however is preferred because reactor fouling is minimized and the EP elastomers are obtained in a more desirable particulate form.

When these supported vanadium carboxylates are used in combination with a cocatalyst such as an aluminum alkyl (e.g., TIBAL) and desirably a halogenated promoter (e.g., $CHCl_3$), they are efficient catalysts for producing the desired EP and EPDM elastomers.

The invention therefore is the use of the heterogeneous catalyst system comprising the supported vanadium carboxylates for producing ethylene/propylene elastomers and EPDM elastomers in polymerization processes manifesting minimal fouling and obtaining polymer product in desirable form. The preferred process is a bulk process; however, these vanadium carboxylate supported catalysts as well as the vanadium carboxylate unsupported catalysts will also have utility in a solution polymerization process or gas phase polymerization processes.

DETAILED DESCRIPTION OF THE INVENTION

The vanadium carboxylate catalysts of the invention were prepared by reacting $VCl_3$ with either an organic carboxylic acid or a Group 1A metal salt of the organic carboxylic acid in a ratio of from about 1:2 to about 1:3. For examples of some of these procedures see, F. A. Cotton, et al., Inorg. Chem. 1986, 25, 3505–3512.

The copolymers prepared using the vanadium carboxylate catalysts of the invention will have from about 35 to about 75 weight percent of ethylene and Mooney viscosities of 11 to 85+ as the measure of molecular weight.

Comonomers other than ethylene will include $C_3$ to $C_{10}$ alpha-olefins. Preferred alpha-olefins are propylene, butene-1, hexene-1, 4-methylpentene-1 and octene-1. Other monomers may also be used and they include conjugated and nonconjugated dienes such as butadiene, 1,4 hexadiene and ethylidene norbornene.

While the ratio of cocatalyst/promoter/vanadium carboylate may vary over a wide range, it is preferred to have a ratio of about 140:150:1.

Experiments are carried out in nitrogen purged dry boxes. All solvents were purchased from commercial sources and nitrogen purged and dried over activated molecular sieves. $VCl_3$ was purchased from commercial sources and used as received. The sodium carboxylates were purchased from commercial sources and analyzed by FT-IR. If water was present the carboxylate salts were dried at 50°–60° C. in vacuo until no water was indicated by FT-IR.

Polymerization promoters were purchased from commercial sources and dried by $N_2$ purging and storing over molecular sieves. Aluminum alkyls were purchased as 20–25 wt % solutions from commercial sources.

All polymerizations were carried out in a stirred two liter autoclave equipped to feed ethylene at constant pressure. In a typical polymerization, the autoclave is charged with the cocatalyst (i.e. aluminum alkyl) and promoter (i.e. trichloro methane) under a $N_2$ purge. The desired amount of hydrogen is added (a 10 psi delta is equivalent to 15.8 mmoles $H_2$), liquid propylene (1000 ml) is added, and the temperature is raised to 55° C. Ethylene is then added to the desired total reactor pressure. When the temperature and pressure are stabilized, the catalyst is washed into the reactor with liquid propylene [250 ml] via a catalyst addition tube.

Copolymerization is carried out for the desired time while ethylene is added as it is consumed in order to maintain a constant total reactor pressure. The run is terminated by rapid cooling and de-pressurization of the reactor. The copolymer is collected and vacuum dried at ambient temperature.

Catalyst efficiency is calculated as g polymer yield/g catalyst charged to the reactor. Weight % ethylene in the copolymer is determined by FT-IR from a calibration using ASTM standards. GPC analysis is carried out at 145° C. in 1, 2,4-trichlorobenzene. Mooney viscosity (ML) is an ML1+4 (ASTM #D1646) measured at 125° C. DSC (Perkin Elmer model DSC7) was determined in a helium atmosphere and % crystallinity was determined by dividing the heat of fusion by 65 cal/g. Crystallinity by X-ray diffraction (Phillips model 3100 or 3600) was determined by area measurement of the PE crystallinity peaks relative to the amorphous area. The % polymer crystallinity by X-ray was calculated by the method of Ver Strate and Wilchinsky (J. Polym. Sci. A-2, 9, 127 1971).

The reactor fouling is an estimated weight of copolymer coating the reactor walls, agitator and thermowell versus the total copolymer produced. For example, severe fouling means greater than 90% of the copolymer weight is adhered to reactor surfaces and slight fouling means less than about 10% of the copolymer weight is adhered to these mentioned areas.

Preparation of Vanadium Carboxylate Catalyst Where $R=CH_2CH_3$ and ED=Tetrahydrofuran.

EXAMPLE 1a

A slurry of dry sodium propionate (102.47 g, 1.07 moles) in dry tetrahydrofuran THF (1600 mls) was heated to 34° C. with stirring. $VCl_3$ (B3.87 g, 0.53 moles) was added with THF (67 mls) to the slurry and the heat gradually increased to 61° C. After 24 hours a dark green slurry was filtered through Celite in a medium frit funnel. The filter cake was washed with THF (50 ml).

The dark green solution was concentrated in two batches at 50° C. on a roto-evaporator to approximately one fifth the original volume. This was poured into dry n-pentane (2087 ml total) to precipitate a dark green solid which was isolated by filtering, washing three times with pentane and drying under vacuum to a constant weight (121.6 g).

To support the compound on silica, the propionate compound ($R=CH_2CH_3$, 120.0 g) was dissolved at 43° C. in dry toluene (2880 mls) and filtered through a medium frit filter. Silica (528 g) previously dehydrated under $N_2$ at 600° C. was added to the filtrate with stirring. After stirring at 36° C. for one hour the slurry was filtered through a medium frit filter (2000 ml). The filter cake was washed with toluene (150 mls) and vacuum dried to a constant weight to give a light green, free flowing solid (633.3 g).

Preparation of Vanadium Carboxylate Catalyst where $R=CH_2CH_3$ and ED=Tetrahydrofuran.

EXAMPLE 1b

A slurry of dry sodium propionate (153.7 g, 1.60 moles) in dry THF (2400 mls) was heated to 41° C. with stirring. $VCl_3$ (125.8 g, 0.80 moles) was added with THF (100 mls) to the slurry and the heat gradually increased to 64° C. After 24 hours a dark green slurry was filtered at 45° C. through Celite in a medium frit funnel. The filter cake was washed with THF (250 ml).

The dark green solution was concentrated batchwise at 50° C. on a roto-evaporator to approximately one fifth of the original volume and poured into dry n-pentane (3000 ml total) to precipitate a dark green solid. Isolation by filtering, washing three times with pentane and drying under vacuum to instant weight gave an emerald green solid (204.0 g) which was recrystallized by dissolving in THF (800 mls), pouring into pentane (3000 mls), filtering and washing with pentane (350 mls). The solids were dried to constant weight to give an emerald green solid (189.1 g).

To support the compound on silica, the propionate compound was dissolved at 45° C. in dry toluene (4490 mls) and filtered through a medium frit filter. Silica (832 g) previously dehydrated under $N_2$ at 600° C. was added to the filtrate with stirring.

After stirring at 38° C. for one hour the slurry was filtered through a medium frit filter (2000 ml). The filter cake was washed with toluene (350 mls) and vacuum dried to constant weight to give a light green, free flowing solid (987.3 g).

Preparation of Vanadium Carboxylate Catalyst Where $R=CH_2CH_3$ and ED=Tetrahydrofuran.

EXAMPLE 1c

A slurry of dry sodium propionate (153.7 g, 1.60 moles) in dry THF (2400 mls) was heated to 38° C. with stirring. $VCl_3$ (125.8 g, 0.80 moles) was added with THF (100 mls) to the slurry and the heat gradually increased to 55° C. After 24 hours a dark green slurry was filtered at 30° C. through ½" of Celite in a coarse frit funnel. The filter cake was washed with THF (300 ml).

The dark green solution was concentrated batchwise at 65° C. on a roto-evaporator to approximately 500 mls and was poured into dry n-pentane (3000 ml) to precipitate a green solid. Isolation by filtering, washing three times with pentane and drying under vacuum to constant weight gave an emerald green solid (198.3 g) which was recrystallized by dissolving (192.0 g) in THF (800 mls), pouring into pentane (3000 mls) and filtering and washing with pentane (350 mls). The solids were dried to constant weight to give an emerald green solid (176.3 g). A second recrystallization was carried out using THF (700 ml) and pentane (3000 mls), and filtering and washing with pentane (1100 mls). The solids were dried to constant weight to give an emerald green solid (165.5 g).

In order to support the compound on silica, the propionate compound ($R=CH_2CH_3$, 163.5 g) was dissolved at 46° C. in dry toluene (3925 mls) and filtered through a medium frit filter. Silica (823 g) previously dehydrated under $N_2$ at 600° C. was added to the filtrate with stirring.

After stirring at 40° C. for two hours the slurry was filtered through a medium frit filter (2000 ml). The filter cake was washed with toluene (320 mls) and slowly vacuum dried to constant weight to give a light green, free solid (861.6 g).

Preparation of Vanadium Carboxylate Catalyst Where $R=CH_2CH_3$ and ED=Tetrahydrofuran.

EXAMPLE 1d

A slurrying of dry sodium propionate (30.74 g. 0.32 moles) in dry THF (475 mls) was heated to 45° C. with stirring. $VCl_3$ (25.16 g, 0.16 moles) was added with THF (25 mls) to the slurry and the heated to 65° C. After 24 hours a dark green slurry was filtered through ½" of Celite in a medium frit funnel. The filter cake was washed with THF (50 ml).

The dark green solution was concentrated at 40°–55° C. on a roto-evaporator to approximately 125 mls and poured into dry N-pentane (600 ml) to precipitate a dark green solid. Isolation by filtering, washing three times with pentane and drying under vacuum to constant weight gave an emerald green solid (40.15 g).

In preparing the silica support for the compound, the propionate compound ($R=CH_2CH_3$, 1.5 g) was dissolved at 65° C. in dry toluene (36 mls), cooled, and filtered through a medium frit filter. Silica (6.6 g) previously dehydrated under $N_2$ at 600° C. was added to the filtrate with stirring.

After stirring at ambient temperature for one hour the B slurry was filtered through a coarse frit filter and the filter cake was washed with toluene (20 mls). The filter cake was divided into three equal portions. The first was slowly dried with a nitrogen purge overnight at ambient temperature to give a light green solid.

Preparation of Vanadium Carboxylate Catalyst where $R=CH_3$ and ED=Tetrahydrofuran.

EXAMPLE 2

A slurry of dry sodium acetate (6.56 g, 0.08 moles) in dry THF (200 mls) was heated to 43° C. with stirring. $VCl_3$ (6.29 g, 0.04 moles) was added with THF (25 mls) to the slurry and then heated to 65° C. After 24 hours a dark green slurry was filtered through ½" of Celite in a medium frit (150 ml) funnel and the filter cake was washed with THF (50 ml).

The dark green solution was concentrated at 50° C. on a roto-evaporator to approximately 60 mls. This was poured into dry n-pentane (300 ml) to precipitate a dark green solid which was isolated by filtering, washing three times with pentane (200 mls) and drying under vacuum to constant weight (9.05 g).

In order to support the compound on silica, the acetate compound (R=CH$_3$) (0.5 g) was dissolved in dry methylene chloride (12 mls) to which was added with stirring silica (2.2 g) previously dehydrated under N$_2$ at 600° C. After stirring at ambient temperature for one hour the slurry was filtered through a medium frit filter (60 ml). The filter cake was washed with methylene chloride (3 mls) and vacuum dried to constant weigh to give a lime green, free flowing solid (2.1 g).

Preparation of Vanadium Carboxylate Catalyst Where R=CH(CH$_3$CH$_3$)C$_4$H$_9$ ED=Tetrahydrofuran.

EXAMPLE 3

A slurry of dry sodium 2-ethyl hexanoate (13.30 g, 0.08 moles) in dry THF (125 mls) was heated to 48° C. with stirring. VCl$_3$ (6.29 g, 0.04 moles) was added with THF (100 moles) to the slurry and the heat increased to 65° C. After 24 hours, a dark green slurry was filtered through ⅛" of Celite in a medium frit (150 ml) funnel and the filter cake was washed with THF (50 ml).

The dark green solution was concentrated at 40°–70° C. on a roto-evaporator to approximately 60 mls and was poured into dry n-pentane (300 ml). Addition of more n-pentane (200 ml) resulted in no precipitation of solid and the total solution was evaporated to an oily, green residue. (11.0 g).

In preparing the silica support, 2-ethyl hexanoate compound (R=CH(CH$_2$CH$_3$)C$_4$H$_9$) (0.5 g) was dissolved in dry toluene (12 mls) to which was added with stirring silica (2.2 g) previously dehydrated under N$_2$ at 600° C.

After stirring at ambient temperature for two hours the slurry was filtered through a medium frit filter. The filter cake was washed with toluene (3 mls) and vacuum dried to a constant weight to give a lime green, free flowing solid (2.15 g).

Preparation of Vanadium Carboxylate Catalyst Where R=C$_6$H$_5$ and ED=Tetrahydrofuran.

EXAMPLE 4

A slurry of dry sodium benzoate (11.53 g, 0.08 moles) in dry THF (125 mls) was heated to 44° C. with stirring. VCl$_3$ (6.29 g, 0.04 moles) was added with THF (100 mls) to the slurry and the heat increased to 65° C.

After about 22 hours the slurry was allowed to settle to give a green solid and a brown solution. The green solid was filtered onto Celite and washed with THF (60 mls). The brown solution was evaporated at 75° C. to about 50 mls. and the concentrated solution was poured into N-pentane (300 mls) to precipitate a brown solid.

The remaining brown solid was broken up, washed three times with pentane (300 ml) and filtered and the dark solid was dried to a constant weight (6.86 g) and was recrystallized by dissolving (6.04 g) in THF (50 mls), pouring into pentane (300 mls), filtering and washing with pentane (200 mls). The solids were dried to a constant weight to give an dark brown solid (4.70 g).

In order to support the compound on silica, the brown vanadium benzoate compound (R=C$_6$H$_5$) (0.5 g) was dissolved in dry methylene chloride (12 mls) to which was added with stirring silica (2.2 g) previously dehydrated under N$_2$ at 600° C.

After stirring at ambient temperature for two hours the slurry was filtered through a medium frit filter and the filter cake was washed with methylene chloride (3 mls) and vacuum dried to a constant weight to give a light tan, free flowing solid (2.10 g).

Preparation of Vanadium Carboxylate Catalyst Where R=CH$_2$CH$_3$ and ED=C$_5$H$_5$N.

EXAMPLE 5

A slurry of dry sodium propionate (7.69 g, 0.08 moles) in dry pyridine (150 mls) was heated to 45° C. with stirring. VCl$_3$ (6.29 g, 0.04 moles) was added with pyridine (75 ml) to the slurry and the heat increased to 65° C. After 24 hours a purple, brown slurry was filtered through ⅛" of celite in a medium frit funnel. The greenish purple filter cake was washed with pyridine (20 ml). The filtrate was evaporated to about 50 mls and poured into N-pentane (300 mls) to precipitate a purple oil. The oil was washed three times with pentane (200 mls) and dried under vacuum to a constant weight to give a tacky solid (11.3 g).

In preparing the silica support, the vanadium carboxylate compound (R=CH$_2$CH$_3$ and ED=C$_5$H$_5$N) (0.5 g) was dissolved in dry methylene chloride (12 mls) to which was added with stirring silica (2.2 g) previously dehydrated under N$_2$ at 600° C.

After stirring at 35° C. for two hours, the slurry was filtered through a medium frit filter and the purple filter cake was washed with methylene chloride (3 mls) and vacuum dried to a constant weight to give a bright purple, free flow solid (2.3 g).

EXAMPLE 6

Preparation of Vanadium Carboxylate Catalyst R=CCl$_3$

A slurry of dry sodium trichloroacetate (14.83 g, 0.08 moles) in dry THF (125 mls) was heated to 50° C. with stirring. VCl$_3$ (6.29 g, 0.04 moles) was added with THF (100 mls) to the slurry and the heat gradually increased to 65° C. After 24 hours the red brown slurry was filtered through Celite in a medium frit funnel. The filter cake was washed with THF (50 ml).

The solution was concentrated at 55° C. on a roto-evaporator to approximately to a volume of 50 ml. This was poured into dry n-pentane (300 ml total) to precipitate a dark brown material which was isolated by washing four times with pentane, filtering, and drying under vacuum to constant weight (17.61). A second recrystallization was carried out by dissolving in THF (65 ml) and precipitating by pouring into pentane (300 mls). Washing three times with pentane, filtering and drying to constant weight gave a brown solid (6.48 g).

The trichloroacetate compound (R=CCl$_3$ 0.5 g) was dissolved at 47° C. in dry toluene (12 mls). Silica 2.2 g, Davidson 948) previously dehydrated under N$_2$ at 600° C. was added to the solution with stirring. After stirring at 40° C. for 2.25 hours the slurry was filtered through a medium frit filter. The filter cake was washed with toluene (3 mls) and vacuum dried to constant weight to give a light green, free flowing solid (2.2 g).

EXAMPLE 7

Preparation of Vanadium Carboxylate Catalyst R=CH$_2$F.

A slurry of dry solidum fluoroacetate (8.00 g, 0.08 moles) in dry THF (125 mls) was heated to 50° C. with stirring. VCl$_3$ (6.29, 0.04 moles) was added with THF (100 mls) to the slurry and the heat gradually increased to 65° C. After 24 hours the slurry was filtered through Celite in a medium frit funnel. The filter cake was washed with THF (50 ml).

The solution was concentrated at 55° C. on a 20 rotoevaporator to approximately a volume of 15 ml. This was poured into dry n-pentane (300 ml total) to precipitate a dark purple material. A second recrystallization was carried out by dissolving in THF (8 ml) and precipitating by pouring into pentane (350 mls). Filtering, washing three time with pentane, and drying to constant weight give a light purple solid (0.92 g). A third recrystallization using THF (13 ml) and pentane (300 mls) gave a purple solid (0.75 g).

The fluoroacetate compound (R=CCH$_2$, 0.5 g) was dissolved in dry methylene chloride (12 mls). Silica (2.2 g, Davison 948) previously dehydrated under N$_2$ at 600° C. was added to the solution with stirring. After two hours the slurry was filtered through a medium frit filter. The filter cake was washed with methylene chloride (3 mls) and vacuum dried to constant weight to give a purple, free flowing solid (2.4 g).

The effect of employing silica supported vanadium carboxylate catalysts during polymerization in the foregoing examples are tabulated in summary form in Table 1 as follows:

(1) In contrast to expectation, the vanadium carboxylates are uniquely different from vanadium beta-diketonates (see Tables 2). In particular, the polymer crystallinity was measured by refractive index (RI) and x-ray diffraction is lower and the more desirable from the vanadium carboxylates; and (2) The vanadium carboxylates are attractive because a lower partial pressure of the ethylene is required relative to studies made on VCl$_3$-3THF based silica supported catalysts.

Table 2 illustrates how vanadium compounds of the invention are superior to other known vanadium compounds in terms of lower ethylene propylene copolymer crystallinity or measured by refractive index (RI) and X-ray crystallinity at similar EP copolymer compositions. Low crystallinity in EP copolymers is desireable to impart superior elastomeric physical properties. Table 3 illustrates the utility of the vanadium carboxylates with aluminum alkyls of the type AlR$_{3-a}$X$_a$ where a=0–1 and X is Cl or OR. Table 4 illustrates the utility of the vanadium compounds of this invention with a wide variety of chlorocarbon or chlorofluorocarbon

TABLE 1

| EXAMPLE | RUN NUMBER | SILICA SUPPORTED | CATALYST AMOUNT (MF) | REACTOR FOULING | CATALYST EFFICIENCY (KG/G) | C$_2$ (wt %) | ML$^3$ | XRC$^1$ (%) | DSC$^2$ (%) | MWD |
|---|---|---|---|---|---|---|---|---|---|---|
| 1a | 1 | No | 10.0 | Severe | 12.22 | 69.2 | 61 | 12.0 | 4.6 | 10.0 |
|    | 2 | Yes | 52.5 | V. Slt. | 1.75 | 61.4 | 60 | 10.5 | 6.5 | 10.6 |
| 1b | 3 | No | 10.0 | Severe | 10.28 | 64.0 | 63 | 13.7 | ND | 8.5 |
|    | 4 | Yes | 50.0 | Slt | 2.02 | 65.9 | 60 | 13.1 | ND | 9.6 |
| 1c | 5 | No | 10.0 | Severe | 8.65 | 68.2 | ND | 11.4 | ND | 9.3 |
|    | 6 | Yes | 50.0 | V. Slt. | 2.13 | 60.6 | 53 | 14.3 | ND | 8.7 |
| 1d | 7 | No | 10.0 | Severe | 8.85 | 57.4 | ND | 9.4 | ND | 8.0 |
|    | 8* | Yes | 7.0 | Slt. | 1 | 61.7 | 65 | 8.9 | 4.6 | 12.9 |
| 2 | 9 | Yes | 50.0 | Slt | 1.39 | 60.2 | 66 | 12.4 | NA | 10.6 |
| 3 | 10 | Yes | 50.0 | Slt. | 1.34 | 62.1 | NA | NA | NA | 5.7 |
| 4 | 11 | Yes | 50.0 | V. Slt. | 0.70 | 61.1 | NA | NA | NA | 15.3 |
| 5 | 12 | Yes | 50.0 | Slt. | 0.49 | 45.5 | NA | 17.0 | NA | 8.3 |
| 6 | 40 | Yes | 50.0 | Slt | 0.39 | 65.8 | NA | 16.7 | NA | 10.8 |
| 7 | 41 | Yes | 50.0 | Slt | 0.74 | 61.3 | NA | 14.5 | NA | 12.3 |

*80 psi C$_2$
ND - Not Determined
NA - Not Available
Conditions: 55° C., 90 psi C2 =, 20 H2
C$_3$ = 1.341, run time = 60 minutes
TIBAL: 3.4 mn; CHCL$_3$ = 3.7 mM
Al/Promoter/V = 140:150:1
$^1$XRC - X-ray crystallinity
$^2$DSC - Differential Scanning Calorimetery
$^3$ML - Mooney Viscosity In testing these vanadium carboxylates in liquid propylene the following important features were observed:

promoters. Table 5 illustrates the broad range of compositions (% ethylene) and broad range of Mooney Viscosities (MV) which can be produced by the vanadium carboxylate of the invention.

TABLE 2

| | RUN TIME (MIN) | TEMP (°C.) | C$_2$ PRESS (PSI) | CAT EFF (KG/G) | C$_2$ = (WT %) | RI | X-RAY CRYSTAL. (%) |
|---|---|---|---|---|---|---|---|
| COMPARATIVE VANADIUM COMPOUNDS | | | | | | | |
| V(acac)$_3$ | 30 | 55 | 100 | 0.60 | 49.9 | 1.4830 | 9.9 |
| V(C-3nBu:acac)$_3$ | 30 | 55 | 100 | 0.35 | 49.8 | 1.4790 | 11.5 |
| V(acac)$_2$Cl | 30 | 55 | 100 | 1.31 | 52.7 | 1.4820 | 12.7 |
| V(n-TOLYL)Cl$_2$(OnBu) | 30 | 55 | 100 | 0.62 | 57.2 | 1.4802 | 17.4 |
| Vcl$_3$.3THF | 30 | 55 | 120 | 3.21 | 50.0 | 1.4740 | 3.5 |
| VANADIUM COMPOUNDS OF THE INVENTION | | | | | | | |
| [V$_3$O(CH$_3$CH$_2$CO$_2$)$_6$.(THF)$_3$]$_2$ | 30 | 55 | 50 | 1.23 | 57.0 | 1.4737 | 2.8 |
| [V$_3$O(CH$_3$(CH$_2$)$_4$CO$_2$)$_6$.$^b$(THF)$_3$]$_2$ | 30 | 55 | 50 | 1.53 | 51.7 | 1.4732 | 2.0 |
| [V$_3$O(CH$_3$(CH$_2$)$_4$CO$_2$)$_6$.$^b$ | 30 | 55 | 50 | 1.84 | 57.3 | 1.4743 | 1.8 |

TABLE 2-continued

| | RUN TIME (MIN) | TEMP (°C.) | $C_2$ PRESS (PSI) | CAT EFF (KG/G) | $C_2=$ (WT %) | RI | X-RAY CRYSTAL. (%) |
|---|---|---|---|---|---|---|---|
| $(THF)_3]_2$ | | | | | | | |

$^a$RUN CONDITIONS: LIQID $C_3$ 1250 ML, 4.5 mMOLES TIBAL, 5.0 mMOLES CHCl$_3$, 30 MG CAT (EXCEPT WHERE NOTED)
$^b$10 MG CATALYST IN 2-3 ML TOLUENE

TABLE 3

ALUMINIUM ALKYLS AS ALTERNATE COCATALYSTS

| Compound | Promoter | Catalyst Efficiency (Kg/g) | $C_2$ wt. % | GPC data MWD | Mn | Mw | Run Number |
|---|---|---|---|---|---|---|---|
| | (50 mg, Example 1b) | | | | | | |
| TEAL | CHCl$_3$ | 0.81 | 63.3 | 9.9 | 32.2 | 316.4 | 1 |
| TEAL | Freon 11 | 0.62 | 66.8 | 10.0 | 30.1 | 301.3 | 2 |
| TEAL | Freon 113 | 0.21 | 71.0 | 9.7 | 27.2 | 263.2 | 3 |
| DEAL-E | CHCl$_3$ | 0.00 | | | | | 4 |
| DEAL-E | NONE | 0.00 | | | | | 5 |
| | (50.0 mg, Example 1c) | | | | | | |
| DEAC | CHCl$_3$ | 0.20 | 50.4 | 11.4 | 27.3 | 307.0 | 6 |
| DEAC | NONE | 0.21 | 57.3 | 12.4 | 22.1 | 271.7 | 7 |
| DEAC+ TIBAL | CHCl$_3$ | 0.90 | 61.3 | 17.3 | 13.2 | 224.6 | 8 |

Conditions:
55° C., 90 psi $C_2=$, 20 psi $H_2$.
$C_3$ = 1.341, run time = 30 minutes.
Al Compound: 3.4 mM; promoter all equimolar (3.7 mM)
Al/Promoter/V = 140:150:1
Freon 11 = CCl$_2$F$_2$; Freon 113 = CFCl$_2$CF$_2$Cl
Mn and Mw are shown × $10^{-3}$
DEAL-E is Et$_2$AlOEt

TABLE 4

FREON 11 AND CCL$_4$ AS ALTERNATE PROMOTERS

| Promoter | Catalyst Efficiency (Kg/g) | $C_2$ (wt. %) | GPC data MWD | Mn | Mw | Relative Efficiency To CHCl$_3$ | Patent Run Number |
|---|---|---|---|---|---|---|---|
| CHCl$_3$ | 1.27 | 61.6 | 10.2 | 26.9 | 273.9 | 2.0 | 1 |
| Freon 11 | 1.12 | 65.3 | 10.3 | 26.2 | 270.3 | 0.88 | 2 |
| Freon 113 | 0.18 | 72.6 | 9.7 | 24.7 | 239.1 | 0.14 | 3 |
| CCl$_4$ | 1.44 | 55.7 | 9.3 | 38.7 | 359.1 | 1.13 | 4 |
| CH$_2$Cl$_2$ | 0.12 | 72.5 | 11.9 | 22.4 | 265.9 | 0.09 | 5 |
| CCl$_3$CH$_3$ | 0.34 | 62.7 | 12.4 | 21.4 | 265.9 | 0.27 | 6 |
| C$_6$H$_5$CH$_2$Cl | 0.72 | 59.6 | 7.9 | 29.7 | 235.5 | 0.57 | 7 |
| C$_6$H$_5$COCl | 0.04 | — | — | — | — | — | 8 |
| NBPCC | 0 | — | — | — | — | — | 9 |
| NONE | 0.46 | 70.2 | 12.4 | 17.2 | 214.3 | 0.36 | 10 |

Conditions:
55° C., 90 psi $C_2=$, 20 psi $H_2$.
$C_3$ = 1.341, run time = 30 minutes.
TIBAL: 3.4 mM; promoter all equimolar (3.7 mM)
Catalyst (50.0 mg, Example 1b)
Freon 11 = CCL$_2$F$_2$; Freon 113 = CFCl$_2$CF$_2$Cl
Mn and Mw are shown × $10^{-3}$
NBPCC = $n$-butylperchlorocrotonate

TABLE 5

PRODUCT AND PROCESS DATA

| RUNS | $C_2=$ (psi) | $H_2$ (psi) | Catalyst Amount (mg) | Catalyst Efficiency (kg/g) | $C_2$ (wt %) | ML | XRC (%) | DSC (%) | MWD |
|---|---|---|---|---|---|---|---|---|---|
| 1 | 50 | 30.0 | 100 | 0.49 | 47.3 | 13 | 3.9 | 1.5 | 11.2 |
| 2 | 110 | 30.0 | 50 | 1.87 | 66.4 | 60 | 13.5 | 7.5 | 9.8 |
| 3 | 50 | 30 | 50 | 0.51 | 43.9 | 10 | 2.6 | 1.4 | 9.8 |
| 4 | 50 | 10.0 | 50 | 1.01 | 52.4 | 59 | 5.2 | 1.4 | 11.7 |
| 5 | 110 | 30.0 | 100 | 1.89 | 69.4 | 49 | 17.1 | 8.6 | 9.8 |
| 6 | 110 | 10.0 | 100 | 2.04 | 68.9 | 56 | 12.3 | 6.6 | 9.4 |
| 7 | 110 | 10.0 | 50 | 1.89 | 65.7 | 62 | 13.1 | 8.2 | 8.5 |
| 8 | 50 | 10.0 | 100 | 1.08 | 51.2 | 58 | 5.0 | 1.4 | 12.7 |

TABLE 5-continued

PRODUCT AND PROCESS DATA

| RUNS | $C_2=$ (psi) | $H_2$ (psi) | Catalyst Amount (mg) | Catalyst Efficiency (kg/g) | $C_2$ (wt %) | ML | XRC (%) | DSC (%) | MWD |
|---|---|---|---|---|---|---|---|---|---|
| 9 | 80 | 20.0 | 75 | 1.47 | 61.7 | 65 | 8.9 | 4.6 | 12.9 |

Conditions:
55° C., $C_3$ = 1.341, run time = 60 minutes
TIBAL: 3.4 mM; $CHCL_3$ = 3.7 mM
Catalyst (Example 1d)

While the invention has been set forth with specific examples which teach preferred embodiments for its practice, it is to be understood that these examples and descriptions are illustrative and not limiting, and that many variations of the invention may be practiced, to include using the supported catalysts in a liquid aqueous system, without departing from the spirit thereof.

What is claimed is:

1. A supported catalyst component comprising a vanadium compound represented by the formulas:
   (1) $(V_3O(RCO_2)_6(ED)_3)_2 \cdot V_2O_2X_6$, or
   (2) $V_3O(RCO_2)_6(ED)_3$,
   wherein R is selected from alkyl, cycloalkyl, aryl and haloalkyl;
   ED is an electron donor selected from alkyl and aromatic carboxylic acids and esters thereof, ketones, amines, and alcohols, alkyl, aromatic, and cycloalkyl ethers and mixtures thereof; and
   X is selected from chloride, bromide, fluoride, and $RCO_2$.

2. The supported catalyst component of claim 1, wherein the solid carrier is one of silica, alumina, silica-alumina.

3. The supported catalyst component of claim 1 wherein the solid carrier is silica.

4. The supported catalyst component of claim 1, wherein the vanadium compound is represented by the formulas $[V_3O(RCO_2)_6(THF)_3]_2$, $V_2O_2Cl_6$, $V_3O(RCO_2)_6(C_5H_5N)_3$ or mixtures thereof.

5. The supported catalyst component of claim 1, further including a promoter represented by the formula:

$$R'_b CX'_{(4-b)}$$

wherein
   R' is hydrogen or unsubstituted or halosubstituted lower alkyl;
   X is halogen, and
   b is 0, 1 or 2.

6. A catalyst component comprising a vanadium compound represented by the formulas:
   (1) $[V_3O(RCO_2)_6(ED)_3]_2 \cdot V_2O_2X_6$, or
   (2) $V_3O(RCO_2)_6(ED)_3$
   wherein R is alkyl, cycloalkyl, aryl and haloalkyl,
   ED is an electron donor selected from alkyl and aromatic carboxylic acid esters, ketones, amines, and alcohols, alkyl, aromatic and cycloalkyl ethers and mixtures thereof, and
   X is selected from chloride, bromide, fluoride or $RCO_2$.

7. A catalyst system comprising the catalyst component of claim 1 and an aluminum alkyl cocatalyst.

8. A catalyst system comprising the catalyst component of claim 6 and an aluminum alkyl cocatalyst.

* * * * *